No. 674,230. Patented May 14, 1901.
L. R. WINNEMORE.
MEASURING AND REGISTERING BOTTLE.
(Application filed Oct. 20, 1900.)
(No Model.)
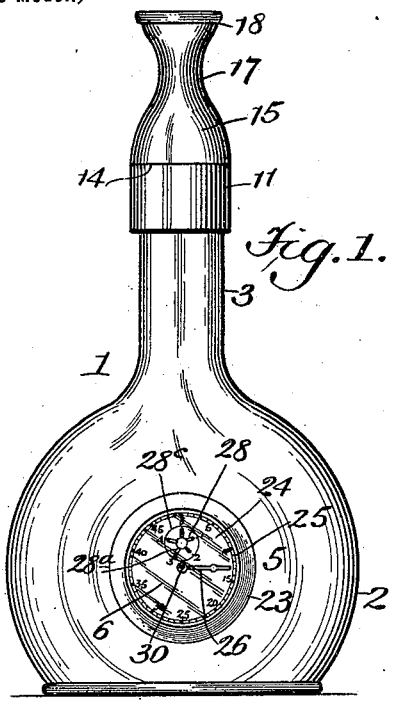
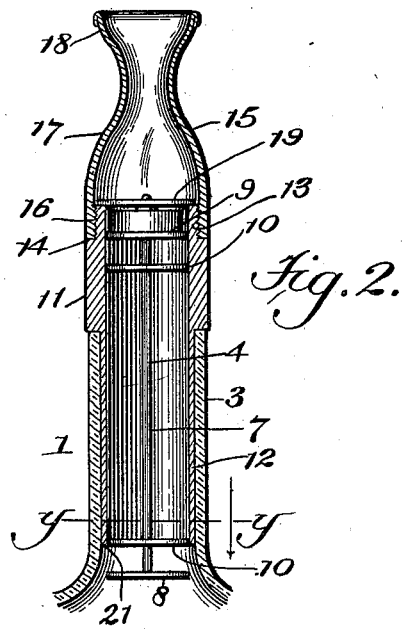
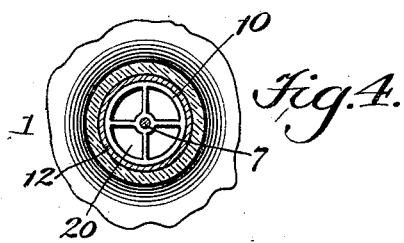
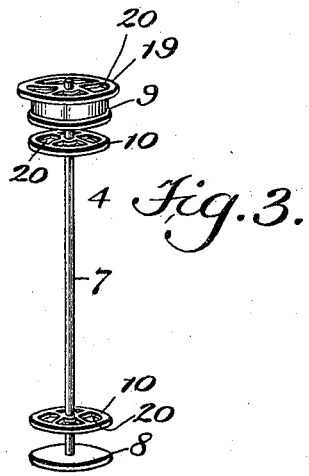
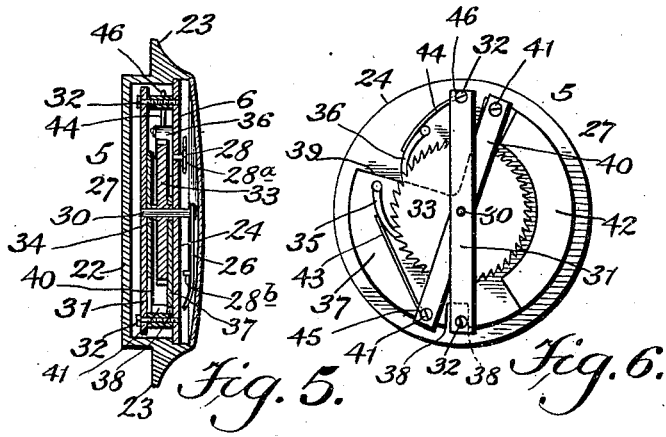
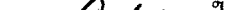

UNITED STATES PATENT OFFICE.

LEWIS R. WINNEMORE, OF PHILADELPHIA, PENNSYLVANIA.

MEASURING AND REGISTERING BOTTLE.

SPECIFICATION forming part of Letters Patent No. 674,230, dated May 14, 1901.

Application filed October 20, 1900. Serial No. 33,696. (No model.)

*To all whom it may concern:*

Be it known that I, LEWIS R. WINNEMORE, a citizen of the United States, residing at Philadelphia, in the county of Philadelphia and State of Pennsylvania, have invented certain new and useful Improvements in Measuring and Registering Bottles, of which the following is a specification.

This invention relates to measuring and registering bottles; and it has for its object to provide a simple and inexpensive bottle of this class which will be superior in point of economy, accuracy, durability, and general efficiency.

A bottle constructed according to the present invention is also designed to be of relatively unimpaired contents-holding capacity, as the measuring and registering devices are of comparatively small bulk and are conveniently and advantageously arranged with respect to economy of the interior or contents-holding space of the bottle.

In the drawings, Figure 1 is a perspective view of a bottle constructed according to the present invention. Fig. 2 is a detail vertical sectional view thereof, taken centrally through the neck portion. Fig. 3 is a detail perspective view of the measuring device in detached position. Fig. 4 is a detail horizontal sectional view taken on the line $y$ $y$, Fig. 2. Fig. 5 is a detail perspective view of the registering device in detached position. Fig. 6 is a detail rear plan view of the dial-plate and pointer-actuating mechanism of the registering device.

Corresponding parts are denoted by the same reference characters in all the figures.

Referring to the drawings, 1 indicates a bottle of any preferred type, consisting of a body portion 2 and a neck portion 3. The measuring device (indicated at 4) is preferably mounted within the neck portion 3, and the registering device 5 is preferably carried within or attached to the body portion 2 at one side of the same.

The measuring device 4 and the registering device 5 are each operated in the tilting movement of the bottle in the manner hereinafter described. At each tilting of the bottle necessary to pour a predetermined portion of the liquid contents from the neck 3 the measuring device cuts off within the neck a predetermined amount of liquid to be discharged. Simultaneously the registering device 5 is actuated to record upon a dial 6 the discharge of liquid made through the measuring device.

The measuring device 4 is entirely housed within the bottle, and comprises a slidably-mounted rod or stem 7, carrying disks or valves 8 and 9, adapted to cut off communication at either end of the bottle-neck, and guides 10, which maintain the device in proper operative position within the bottle-neck.

The bottle-neck 3 is provided at its orifice with a cylindrical exterior collar 11, upon which a tubular casing 12 extends downwardly within and is secured to the inner sides of the bottle-neck. The collar 11 is provided with a projecting screw-threaded portion 13, which terminates at its lower end in an annular shoulder 14. A detachable tubular cap 15 is carried by the collar 11 and is provided at its lower end with interior screw-threads 16, which fit the screw-threaded portion 13 of the collar 11. The cap 15 is adapted to be seated firmly down upon the shoulder 14. The cap 15 is preferably tapered in form, as at 17, whereby the measuring device 4 in its outward movement when the bottle is tilted for pouring engages with said tapered portion and is limited in its further movement in that direction for the purpose hereinafter described. The extreme outer or upper end portion of the cap 15 is enlarged, as at 18, to facilitate pouring.

The collar 11 and casing 12 are preferably metallic and cylindrical in form, and the disks 8 and 9 and guides 10 are preferably metallic and circular in form and closely fit the inner surface of the casing 12 in the sliding movement of the rod 7. The extreme upper end of the rod 7 carries a stop 19, which operates in connection with the upper end portion of the threaded extension 13 of the collar 11 and limits the inward play of the rod 7. The stop 19 also engages the contracted portion 17 of the cap 15 in the outward movement of the rod. The guides 10 and stop 19 are each cut out or recessed at a number of points, as at 20, to permit passage of the liquid through the same.

In assembling the several parts of the measuring device the stop 19 is secured to the upper end of the rod 7 and the disk 8 to the lower end of the same, and the distance between the same is such that when the measuring device is in operative position in the neck 3 and the stop 19 rests in engagement with the top of the extension 13 of the collar 11 the disk 8 projects below the lower end of the casing 12, which latter preferably extends downwardly in the bottle-neck to the point, as at 21, at which the body portion 2 of the bottle flares away from the neck.

The contracted portion 17 of the cap 15 is so arranged when the cap is in operative connection with the collar 11 that when the bottle is tilted into the pouring position the said contracted portion is engaged by the stop 19 when the rod 7 has moved a sufficient distance within the bottle-neck to carry the disk 8 into the casing 12 and to carry the disk 9 out of the casing 12, and thus cut off communication with the casing 12 at the bottom and establish communication within the casing 12 at the top.

The registering device 5 is provided with a casing 22, preferably embodying an annular flange 23, and the bottle-body 2 is formed to receive the casing 22, which latter is suitably secured to the body, preferably by means of adhesive material applied to the casing 22 and flange 23. The casing 22 carries at its front, preferably approximately flush with the bottle-body 2, a dial-plate 24, upon which are arranged an annular series of graduations 25, in relation to which operates a pointer 26. Suitable gravity-actuated mechanism 27 within the casing 22 operates to move the pointer relative to the dial. The dial 24 preferably carries a supplemental registering member 28, consisting of a star-wheel 28ª, which is operated at each complete revolution of the pointer relative to the dial-plate by a projection 28ᵇ upon the pointer. The dial-plate is provided with a supplemental annular series of graduations 28ᶜ, in connection with which a pointer 28ᵈ upon the star-wheel is read. The graduations 25 in the present instance are illustrated as reading from "0" to "50" and the graduations 28ᶜ from "1" to "5," so that the register has a total registering capacity of two hundred and fifty, being thus capable of registering two hundred and fifty discharges from the bottle. The pointer 26 is preferably carried by a pointer-shaft 30, journaled in the dial-plate 24 and in a bridge-strip 31, supported by pins 32, secured to the back of the dial-plate 24. A ratchet 33 is rigidly mounted upon the shaft 30 by means of a sleeve 34 and is intermittently revolved to a predetermined extent by an oscillating pawl 35. A check-pawl 36 is mounted upon the back of the dial-plate 24 and operates with respect to the ratchet 33. The pawl 35 is preferably carried upon a swinging plate 37, centered upon the shaft 30, beneath the ratchet 33, and cut out peripherally to form shoulders, as at 38, which engage with one of the pins 32 to limit the play of the plate 37, whereby it causes in each complete oscillation the engagement and movement by the pawl 35 of one of the teeth of the ratchet a sufficient distance to register once upon the dial-plate 24. The plate 37 is also cut out at another edge portion, as at 39, to provide space for the check-pawl 36, which is pivoted to the back of the dial-plate. The plate 37 also carries a bridge-strip 40, which is secured to the same by pins 41 and is interposed between the bridge 31 and the ratchet 33. The bridge-strip 40 bears operatively upon the bridge-strip 31 and maintains the plate 37 and parts carried thereby and the ratchet 37 in proper relative operative position. The plate 30 also carries at one side, and preferably directly opposite the pawl 36, a weight 42, which is preferably segmental in form to accommodate the adjacent periphery of the ratchet 33. Each of the pawls 35 and 36 is maintained in operative connection with the ratchet 33 by a spring 43 and 44, respectively, preferably carried by the dial-plate 24 and the swinging plate 37, as at 45 and 46, respectively.

The registering device 5 is preferably so connected with the bottle-body that the weight 42 lies entirely at one side of a line drawn through the pointer-shaft 30 and through a central vertical plane of the bottle.

The operation and advantages of the improved measuring and resistering bottle will be readily understood.

To fill the bottle, the cap 15 is unscrewed from the collar 11, and the measuring device 4 is then readily removed from the casing 12, allowing unobstructed filling of the bottle. The measuring device is then slipped into place and the cap 15 is screwed onto the collar 11. Normally the measuring device occupies the position shown in Fig. 2, the stop 19 resting upon the extension 13 of the collar 11, the disk 8 projecting slightly below the casing 12 and the disk 9 lying within the upper end of the casing 12. The guides 10 lie at all times within the casing 12 and maintain the rod 7 and disks 8 and 9 in proper alinement and in slidable connection with the casing 12. When the bottle is tilted to a horizontal position and a little therebeyond, the liquid in the bottle flows by the disk 8 and enters the casing 12 in the bottle-neck and immediately fills, or approximately fills, said casing. When the bottle is further tilted, the contents of the casing pressing with increasing weight upon the disk 9 forces the same forwardly and out of the casing 12 to a degree limited by the engagement of the stop 19 with the contracted portion 17 of the cap 15. The movement of the disk 9 establishes communication between the cap 15 and the casing 12 and permits the contents of the casing 12 to flow into the cap 15 and thence to be decanted through the enlarged mouth portion 18 of the cap. The movement, as above described, of the disk 9 causes the disk 8 to move into the inner end of the casing 12. In this position the disk 8 cuts off communication between the bottle-body and the casing 12 and only permits the discharge from the casing 12 of such liquid as has entered it previous to such movement of the disk 8.

It will be noted from the above that only a predetermined portion of the contents of the bottle can be discharged through the neck of the same at any one tilting.

The registering device 5 records upon the dial 24 each tilting movement of the bottle sufficient to pour a portion of the contents from the same, which portion is measured out in the manner above described. It will be understood that the registering device 5 will be operated to the extent of a single record upon the dial 24 each time the bottle is tilted for the purpose of decanting any portion of the contents which has been cut off in the neck by the measuring device 4. Therefore a small discharge from the bottle will be recorded or registered in the same manner as the full discharge allowed by the measuring device 4, and the residue of the portion of the contents cut off in the neck will return into the bottle-body when the bottle is again restored to upright position. The weight 42 being, as above described, arranged at one side of a line drawn through the shaft 30 or pivotal point of the plate 37 and through a central longitudinal plane of the bottle swings upon the shaft 30 in a plane longitudinally of the bottle when the latter is tilted without regard to the position of the registering device relative to the bottle whether above or below the same. A complete oscillation of the weight 42 causes a complete oscillation of the plate 37, as determined by the engagement of the shoulders 38 of the same with the pin 32, interposed between said shoulders, and this oscillation of the plate 37 causes the engagement and complete operation of one of the teeth of the ratchet 33 by the pawl 35 and the consequent movement of the pointer-shaft 30 necessary to cause the pointer 26 to move from one of the graduations 25 of the dial-plate 24 to the next adjacent graduation in advancing movement, thus indicating the fact that the bottle has been once tilted and a single portion of the contents as measured by the measuring device 4 has been poured from the bottle.

It will be noted that the measuring device 4, being housed within the neck of the bottle, does not limit the contents-holding capacity of the bottle and that the registering device 5, to the same end, projects but very slightly into the interior of the bottle.

I do not desire to limit myself to the specific details of construction and arrangement as described, as it is manifest that considerable variation and modification of the same may be resorted to in adapting the device to varying conditions of use. I therefore reserve the right to all such variation and modification as falls within the scope of my invention and the terms of the following claims.

Having thus described my invention, I claim and desire to secure by Letters Patent—

1. A bottle provided with a neck portion and with a movable measuring device operating within the same to alternately cut off communication with the same at the outer and at the inner end portion in the tilting movement of the bottle, said measuring device consisting of a stem slidably mounted in the neck portion, a plurality of valve-disks carried by the stem, and means carried by the stem for guiding and limiting the valve-disks in their movement in the neck portion of the bottle.

2. A bottle provided with a neck portion and with a movable measuring device operating within the same to successively cut off communication with the same at the outer and at the inner end portion in the tilting movement of the bottle, said measuring device consisting of a stem slidably mounted in the neck portion and a plurality of valve-disks and a plurality of guide devices carried by the stem and fitting the interior of the neck portion, means carried by the stem limiting the movement of the same in one direction, and independent means limiting the movement of the stem in the other direction.

3. A bottle provided with a movable measuring device operating with respect to the orifice thereof and with a tubular discharge-cap secured over the orifice and provided with a contracted portion which serves as a stop limiting the movement of the measuring device.

4. A bottle provided with a movable measuring device operating with respect to the orifice thereof and a detachable tubular discharge-cap secured over the orifice and provided with a contracted portion which serves as a stop limiting the movement of said measuring device, said cap having an enlarged outlet portion.

In testimony whereof I have signed my name in the presence of the subscribing witnesses.

LEWIS R. WINNEMORE.

Witnesses:
 WM. F. GOODWIN,
 GEO. W. CLEMENT.